United States Patent
Cook et al.

[11] Patent Number: 5,701,063
[45] Date of Patent: Dec. 23, 1997

[54] OBSTRUCTION-SENSING SYSTEM FOR A MOVABLE MEMBER

[75] Inventors: Roger Joseph Cook, Livonia; Joseph Paul DeVoe, Royal Oak; Kevin Douglas Macfarlane, Plymouth; Daniel Robert Parks, Farmington; Patrick William Gibson, Northville, all of Mich.

[73] Assignee: Ford Global Technologies, Inc., Dearborn, Mich.

[21] Appl. No.: 417,359

[22] Filed: Apr. 5, 1995

[51] Int. Cl.$^6$ .............................. H02H 7/085; H02P 1/22
[52] U.S. Cl. .................. 318/469; 318/265; 318/286; 318/434; 318/459; 318/471
[58] Field of Search .................... 318/264, 265, 318/266, 286, 434, 459, 466, 467, 468, 469, 471, 479; 388/903, 907.5, 934

[56] References Cited

U.S. PATENT DOCUMENTS

| | | | |
|---|---|---|---|
| 4,585,981 | 4/1986 | Zintler | 318/615 |
| 4,628,234 | 12/1986 | Mizuta et al. | 318/267 |
| 4,641,067 | 2/1987 | Iizawa et al. | 318/287 |
| 4,678,975 | 7/1987 | Vrabel et al. | 318/266 |
| 4,686,598 | 8/1987 | Herr | 361/31 |
| 4,709,196 | 11/1987 | Mizuta | 318/282 |
| 4,746,845 | 5/1988 | Mizuta et al. | 318/286 |
| 4,808,894 | 2/1989 | Mizuta | 318/266 |
| 4,900,994 | 2/1990 | Mizuta | 318/283 |
| 5,012,168 | 4/1991 | Dara et al. | 318/434 |
| 5,069,000 | 12/1991 | Zuckerman | 49/28 |
| 5,245,258 | 9/1993 | Becker et al. | 318/266 |
| 5,278,480 | 1/1994 | Murray | 318/626 |
| 5,293,104 | 3/1994 | Dreier | 318/280 |
| 5,337,013 | 8/1994 | Langer et al. | 324/537 |
| 5,399,950 | 3/1995 | Lu et al. | 318/565 |
| 5,483,135 | 1/1996 | Parks | 318/469 |

FOREIGN PATENT DOCUMENTS

| | | |
|---|---|---|
| A-0597272 | 5/1994 | European Pat. Off. |
| A-3532078 | 4/1986 | Germany |

*Primary Examiner*—Bentsu Ro
*Attorney, Agent, or Firm*—Mark S. Sparschu

[57] ABSTRACT

In one embodiment of the present invention, a "one-touch-up" power window system is provided for a motor vehicle. The system includes a controller which controls the power window motor. One function of the controller is to determine whether an obstruction impedes travel of the power window. The controller takes a plurality of samples of the electrical current drawn by the power window motor. If the last sample varies by more than a predetermined amount from any of the past samples taken over a predetermined distance of travel of the window, the controller concludes that an obstruction impedes the travel of the window. The controller then stops or reverses the power window motor to stop or reverse travel of the power window. In this embodiment of the present invention, distance of travel of the window can be inferred from rotations of the power window motor.

18 Claims, 2 Drawing Sheets

OBSTRUCTION-SENSING SYSTEM FOR A MOVABLE MEMBER

BACKGROUND OF THE INVENTION

1. Field of the Invention

The present invention relates to an obstruction-sensing system for a movable member.

2. Description of the Related Art

With the ever-increasing electrical and electronic content on motor vehicles comes the opportunity to offer additional features. One feature increasing in application is the one-touch-up power window system.

A one-touch-up power window is designed to travel from its fully-open position to its fully-closed position after only a momentary press of the power window "up" switch. The window will continue to travel up until the power window "up" or "down" switch is pressed, the window reaches its fully raised position, or an obstruction is sensed in the window's path.

A number of systems have been proposed to perform an obstruction sensing function. In the design of an obstruction sensing system, safety is of course always the paramount concern. However, a number of very safe systems can vary in their ability to reject false indications that an obstruction is in the path of the moving member in question (e.g., power window, power roof panel, power door, etc.).

One proposed obstruction-sensing system is detailed in U.S. Pat. No. 4,709,196, issued to Mizuta. This system senses a difference in current of the window motor —current being representative of the force resisting window movement—to determine whether the window has contacted an obstruction. The difference in current which is sensed is the difference between the present current and a scaled and time-delayed version of the current. Further, a time delay is applied immediately after the motor begins running, to prevent motor inrush current from being interpreted as an obstruction-caused current increase.

Other systems may prove to be as safe or safer and may also be better at rejecting false obstruction indications. Therefore, an obstruction-sensing system which provides an uncompromising level of safety while rejecting false obstruction indications can provide advantages over the prior art.

SUMMARY OF THE INVENTION

The present invention provides a method for detecting an obstruction of a moving member. The method comprising the step of taking a plurality of measurements of a variable representative of a force resisting the movement of the moving member. The method also includes the step of comparing the last measurement with previous measurements taken over a predetermined distance of movement of the movable member. Additionally, the method comprises the step of reversing or stopping the movement of the moving member if at least one of the comparisons yields a difference larger than a predetermined value.

The present invention further provides a method for detecting an obstruction of a moving member driven by a motor. The method comprises the step of taking a plurality of measurements of electrical current of the motor. The method additionally includes the step of comparing the last measurement with previous measurements taken over a predetermined number of rotations of the motor. Further, the method includes the step of reversing or stopping the movement of the moving member if at least one of the comparisons yields a difference larger than a predetermined value.

The present invention also provides an apparatus for detecting the obstruction of a movable member. The apparatus includes a movable member and a motor mechanically coupled to drive the movable member. The apparatus further comprises means for measuring a force resisting movement of the movable member when the movable member is moving. Also, the apparatus includes means for comparing the last measurement with a predetermined number of previous measurements taken over a predetermined number of rotations of the motor. Further, the apparatus includes means for stopping or reversing the movement of the movable member if the comparison yields a difference greater than a predetermined value.

This invention allows for an obstruction-sensing system which is extremely safe and which is further quite effective at rejecting false obstruction indications. In providing these features, the present invention can provide advantages over prior art obstruction-sensing systems.

DETAILED DESCRIPTION OF THE PREFERRED EMBODIMENT

Figure 1:
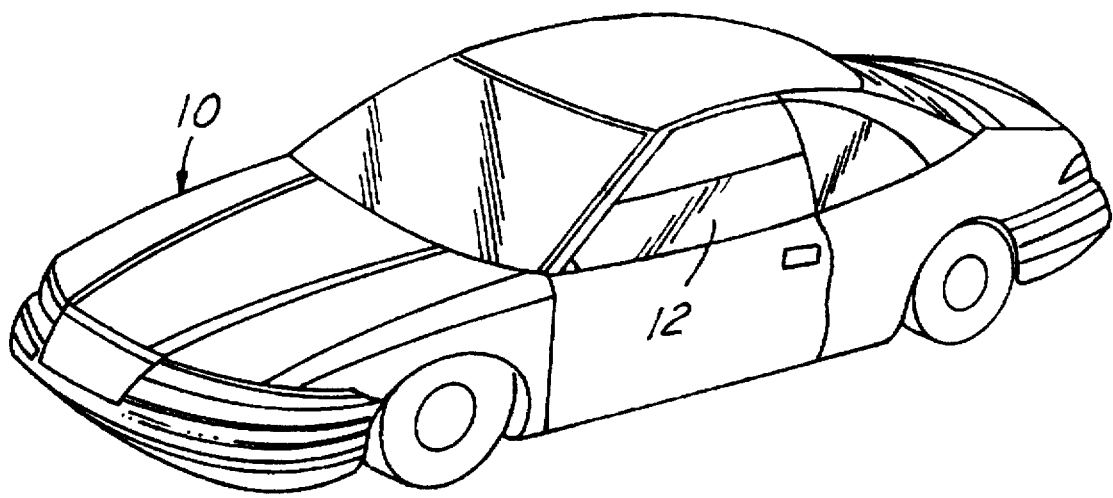
FIG. 1 is a view of a vehicle 10 and a "one-touch-up" power window 12 of that vehicle.

Referring to FIG. 1, a motor vehicle 10 is illustrated. Also illustrated is window 12. According to one embodiment of the present invention, window 12 is a "one-touch-up" power window.

Figure 2:
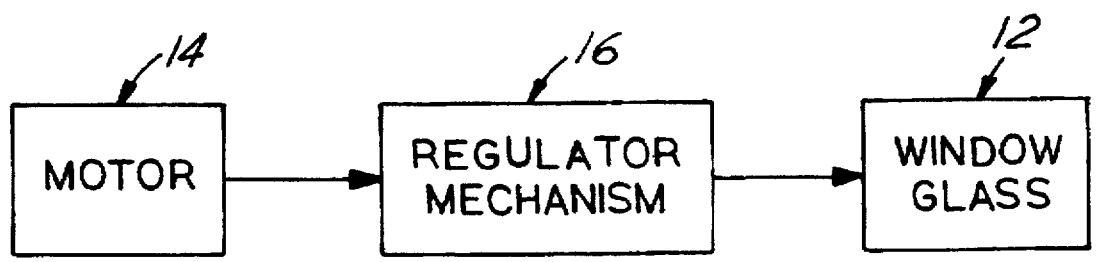
FIG. 2 is a mechanical block diagram of the power window system of vehicle 10 of FIG. 1.

Referring further to FIG. 2, the mechanical components of the window system are illustrated in block diagram form. An electric motor 14 drives window 12 up and down via a regulator mechanism 16. Regulator mechanism 16 is a conventional mechanism known in the art and will therefore not be described here in further detail.

Figure 3:
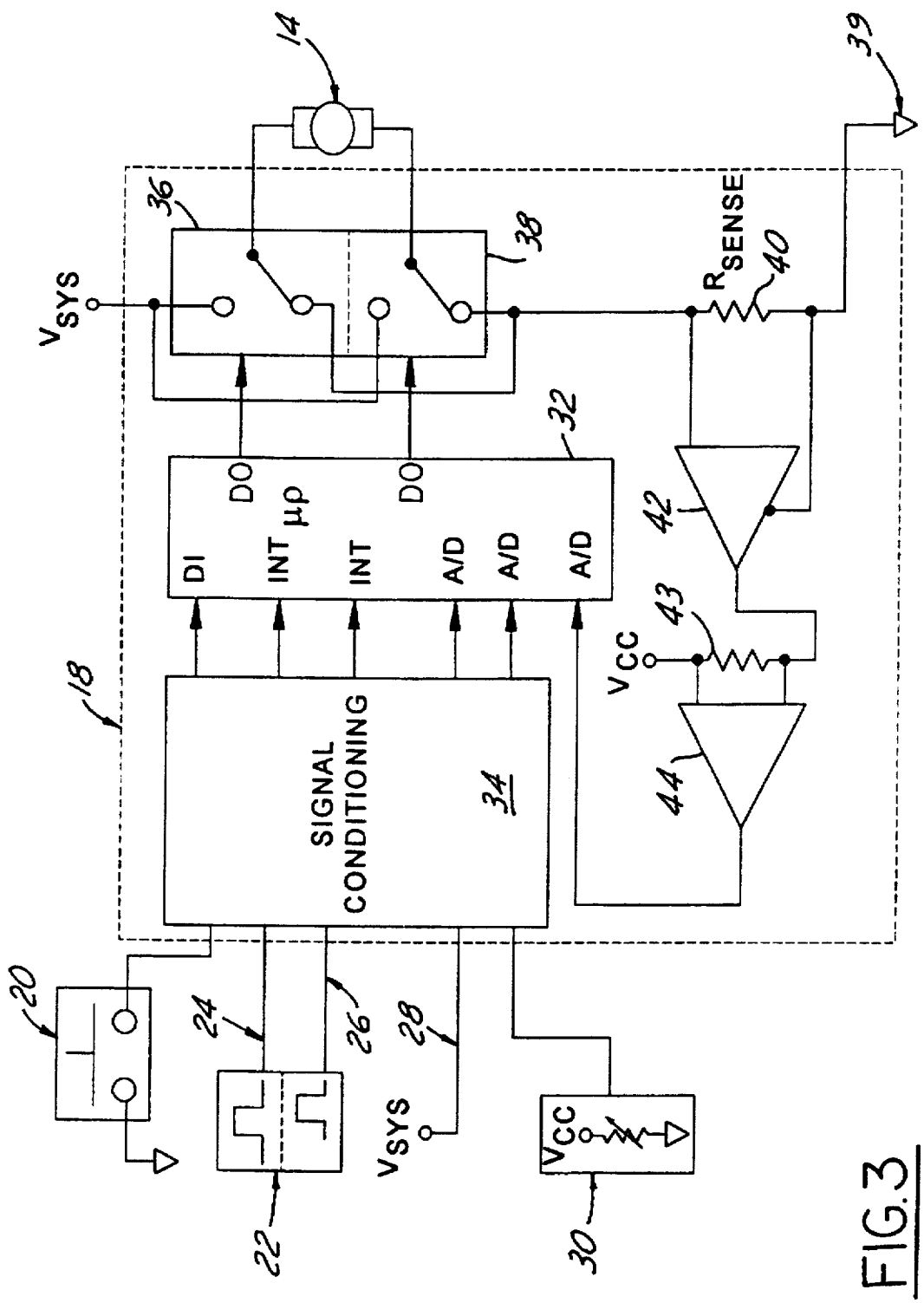
FIG. 3 is an electrical block diagram of the power window system of vehicle 10 of FIG. 1.

Referring additionally to FIG. 3, an electrical block diagram of the one-touch-up window system is illustrated. Controller 18 has the responsibility for controlling the operation of motor 14. Controller 18 has the ability to control the raising and lowering of window 12.

Inputs to controller 18 include power window up switch 20. This switch is depressed by the driver of the vehicle to cause upward movement of window 12. When pressed for a short time (for example, one-half second), controller 18 drives window 12 up in "one-touch-up" fashion. That is, when the driver subsequently releases switch 20, controller 18 will continue to drive window 12 upward until switch 20 is pressed again, the power window down switch (not shown) is pressed, window 12 reaches its full upward limit of travel or until controller 18 senses that an obstruction impedes the upward travel of window 12. If switch 20 is pressed for longer than the short time which will initiate "one-touch-up" movement of window 12, the control of window 12 will be "manual". That is, window 12 will move upward only as long as switch 20 is pressed.

Another input to controller 18 is motor rotation sensor 22. Motor rotation sensor 22 is a Hall-effect sensor mounted within motor 14 to sense rotation of the armature of motor 14. Motor rotation sensor 22 generates two quadrature signals, on circuits 24 and 26. These quadrature signals are each nominally 50% duty-cycle square waves, 90 degrees out of phase with one another. Each signal is high for one-half rotation of motor 12 and low for the other half.

Another input to controller 18 is system voltage of vehicle 10 (nominally 12 volts but typically subject to variations of several volts), which is connected via circuit 28. Controller 18 senses system voltage to aid in its control of motor 14.

Yet another input to controller 18 is temperature sensor 30. This sensor provides an indication of ambient temperature experienced by vehicle 10. This sensor is preferably a thermistor pulled up to $V_{cc}$ (nominally 5 volts) of controller 18.

Controller 18 will now be described. Controller 18 includes microprocessor 32. Microprocessor 32 is chosen to have sufficient microcomputer resources (throughput, registers, memory, inputs, outputs, etc.) to perform the functions ascribed to it herein. Between microprocessor 32 and the various inputs to controller 18 is appropriate signal conditioning circuitry 34 to prepare the various input signals for input to microprocessor 32. Such signal conditioning circuitry is well-known to one skilled in the art and is not unique to this invention. It will thus not be described in detail here.

After the input signals have been conditioned by signal conditioning circuitry 34, they are fed to microprocessor 32. As illustrated, the two signals from motor rotation sensor 22 are preferably fed into interrupt inputs (INT) of microprocessor 32; the signal from power window up switch 20 is preferably fed into a discrete input (DI) of microprocessor 32; and system voltage and ambient temperature are input into analog-to-digital (A/D) inputs of microprocessor 32.

Also included in controller 18 are two relays 36 and 38, connected in an "H"-bridge configuration. Each of those relays is controlled by a separate discrete output (DO) of microprocessor 18. Relays 36 and 38 switch the power to drive motor 14 in its two directions, to raise and lower window 12. As shown in their de-energized state, both relays are connected to ground; motor 14 thus does not rotate when relays 36 and 38 are in this state. When relay 36 is energized, however, motor 14 rotates to drive window 12 upward. When relay 38 is energized, motor 14 rotates to drive window 12 downward.

Regardless of the direction of rotation of motor 14, the electrical current drawn by motor 14 flows through current sense resistor 40. Current sense resistor 40 is preferably a very small resistor, the voltage across which is proportional to the current drawn by motor 14. Amplifier 42 converts the voltage across resistor 40 to a current, which flows through resistor 43. Amplifier 44 then amplifies the voltage across resistor 43, the output of amplifier 44 being provided to an A/D input of microprocessor 32. Controller 18 is thus able to measure the amount of current drawn by motor 14. This current is representative of the force resisting the movement of window 12. The use of amplifiers 42 and 44 as described here eliminates measurement inaccuracy which may occur due to differences in potential between power ground 39 and the electronic ground for controller 18.

When driving window 12 up in one-touch-up mode, one function of controller 18 is to stop or reverse motor 14 when an obstruction impedes the upward movement of window 12. That function will now be more fully described.

Given a definable minimum spring rate of an obstructing object, a distance of travel of window 12 to generate a maximum allowable obstruction force can be calculated. For example, for a spring rate of 10 N/mm and a maximum-allowable obstruction force of 100 newtons, it can be calculated that 10 millimeters of window travel after contact with an obstructing object will cause the obstructing force to reach the maximum-allowable 100-newton threshold.

In performing its obstruction detecting function, controller 18 samples and stores the measured current of motor 14 upon every interrupt generated by sensor 22 (i.e., two times for every rotation of motor 14). Controller 18 continually compares the last current sample with a predetermined past number of current samples representative of that distance of window travel during which an obstruction could generate the maximum allowable obstruction force (10 millimeters in the preceding example). (Because window regulator mechanism 16 is a known device, the relationship between revolutions of motor 14 and distance of travel of window 12 is known.)

If the last current sample is greater by more than a predetermined amount than any of the past samples with which it is compared, controller 18 determines that an obstruction has been encountered by window 12. Controller 18 then stops or reverses motor 14 to stop or reverse window 12.

One will thus recognize that the entire current rise caused by an obstruction of the known minimum spring rate will occur within the subset of electrical current readings used for comparison with the last electrical current reading. So, an obstruction will be positively detected. However, a current rise which occurs over a longer distance—which can therefore not be due to an obstruction in the path of the window—will not be detected as an obstruction.

As has been discussed, the relationship between revolutions of motor 14 and travel of window 12 is known. However, the relationship can vary within a given window regulator mechanism depending upon the position of the window within its travel. Therefore, depending upon the number of rotations of motor 14 away from the bottom of travel of window 12, the past number of current readings used for comparison with the last reading can differ.

For purposes of illustration only, the use of the obstruction-detecting system described herein with one particular window mechanism resulted in the following numbers of current readings used for each position of the window.

TABLE 1

| Window Position (number of motor interrupts from the bottom of window travel) | Number of Past Current Readings used for Comparison With Last Reading |
|---|---|
| greater than 580 | 28 |
| greater than 800 | 32 |
| greater than 1000 | 35 |

It was recognized by the designers of this system that an obstruction intended to be detected by the present system will not be a concern if window 12 is below the position defined by motor 14 being 580 interrupts from the bottom of the travel of window 12. Therefore, the obstruction detection of the present system is not performed for this particular window until the window is above 580 motor interrupts from the bottom of its travel. Other block detection methods may be employed prior to this point, however (such as an algorithm which will stop or reverse motor 14 if no motor interrupts come or if interrupts come at an extremely low rate).

The operation of a motor such as motor 14 is dependent somewhat on temperature and on voltage. Further, the mechanical characteristics of regulator mechanism 16 depend somewhat on temperature. Recognizing these facts, an enhancement to the obstruction detection system can be made. The electrical current difference which will be considered an obstruction can be made a function of ambient temperature and of the system voltage of vehicle 10. For a particular window system, the electrical current difference used as a function of temperature and system voltage is shown in the following Table 2. Again, these detailed values are merely illustrations of how the obstruction detecting system of this embodiment of the present invention have been applied to one specific window system.

TABLE 2

| Temperature Range | Voltage Range | | |
|---|---|---|---|
| | 9 volts to 11 volts | 11 volts to 14 volts | greater than 14 volts |
| less than 0° C. | 26 A/D counts (2.8 amps) | 25 A/D counts (2.69 amps) | 19 A/D counts (2.04 amps) |
| 0° C. to 20° C. | 19 A/D counts (2.04 amps) | 18 A/D counts (1.94 amps) | 13 A/D counts (1.4 amps) |
| 20° C. to 45° C. | 14 A/D counts (1.51 amps) | 11 A/D counts (1.18 amps) | 10 A/D counts (1.08 amps) |
| greater than 45° C. | 11 A/D counts (1.18 amps) | 9 A/D counts (0.97 amps) | 8 A/D counts (0.86 amps) |

As an illustration, choose one particular example: a system voltage of 12 volts and a temperature of 25° C. In that situation, a comparison of the last measured current with the appropriate number of past measured currents (Table 1) yielding a difference of greater than 1.18 amps will indicate to controller 18 that an obstruction impedes window 12. Controller 18 will thus stop or reverse motor 14, thereby stopping or reversing window 12.

It should be noted that voltage and temperature dependency of Table 2 can be done away with by selecting a single electrical current difference as a threshold. The voltage and temperature dependency of Table 2 simply provides an enhancement to the basic obstruction detecting method and apparatus of the present invention.

In order to reduce the influence of a large inrush current of motor 14 on the present obstruction sensing system, obstruction sensing preferably does not begin until a predetermined number of motor interrupts have occurred following the beginning of rotation of motor 14.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for detecting an obstruction of a moving member, said method comprising the steps of:
   (a) taking a plurality of measurements of a variable representative of a force resisting the movement of said member;
   (b) comparing the last said measurement with more than one previous said measurements taken over a predetermined distance of movement of said moving member during the present movement of said moving member; and
   (c) reversing or stopping the movement of said moving member if at least one of said comparisons yields a difference larger than a predetermined value.

2. A method as recited in claim 1 wherein said moving member is a component of a motor vehicle.

3. A method as recited in claim 2 wherein:
   said moving member is driven by a motor; and
   said variable representative of a force resisting the movement of said moving member is electrical current drawn by said motor.

4. A method as recited in claim 3 wherein said predetermined distance of movement is inferred from rotations of said motor.

5. A method as recited in claim 4 wherein said moving member is a window.

6. A method as recited in claim 3 wherein said predetermined value is a function of ambient temperature in the vicinity of the vehicle.

7. A method as recited in claim 6 wherein said predetermined value is a function of system voltage of said vehicle.

8. A method as recited in claim 3 wherein said predetermined value is a function of system voltage of said vehicle.

9. A method for detecting an obstruction of a moving member driven by a motor, said method comprising the steps of:
   (a) taking a plurality of measurements of electrical current drawn by said motor;
   (b) comparing the last said measurement with more than one previous said measurements taken over a predetermined number of rotations of said motor during the present movement of said moving member; and
   (c) reversing or stopping the movement of said moving member if at least one of said comparisons yields a difference larger than a predetermined value.

10. A method as recited in claim 9 wherein said moving member is a window of a motor vehicle.

11. A method as recited in claim 10 wherein said predetermined value is a function of the ambient temperature in the vicinity of the motor vehicle.

12. A method as recited in claim 11 wherein said predetermined value is a function of system voltage of said motor vehicle.

13. A method as recited in claim 10 wherein said predetermined value is a function of system voltage of said motor vehicle.

14. An apparatus for detecting the obstruction of a movable member, said apparatus comprising:
   (a) a movable member;
   (b) a motor mechanically coupled to drive said movable member;
   (c) means for taking, when said movable member is moving, a plurality of measurements of a quantity representing a force resisting movement of said movable member;
   (d) means for comparing the last said measurement with more than one previous said measurements taken over a predetermined number of rotations of said motor during the present movement of the movable member; and
   (e) means for stopping or reversing the movement of said movable member if said comparison yields a difference greater than a predetermined value.

15. An apparatus as recited in claim 14 wherein said movable member is a component of a motor vehicle.

16. An apparatus as recited in claim 15 further comprising means for adjusting said predetermined value as a function of the ambient temperature in the vicinity of the motor vehicle.

17. An apparatus as recited in claim 16 wherein said apparatus further comprises means for adjusting said predetermined value as a function of system voltage of said motor vehicle.

18. An apparatus as recited in claim 15 wherein said apparatus further comprises means for adjusting said predetermined value as a function of system voltage of said motor vehicle.

* * * * *